J. JOHNSON.
Furniture Casters.

No. 153,714. Patented Aug. 4, 1874.

Witnesses,
Chas H Smith
Geo. D. Pinckney

Inventor
Job Johnson
per Lemuel W. Serrell
atty.

UNITED STATES PATENT OFFICE.

JOB JOHNSON, OF BROOKLYN, NEW YORK.

IMPROVEMENT IN FURNITURE-CASTERS.

Specification forming part of Letters Patent No. 153,714, dated August 4, 1874; application filed February 14, 1874.

CASE C.

*To all whom it may concern:*

Be it known that I, JOB JOHNSON, of Brooklyn, in the county of Kings and State of New York, have invented an Improvement in Ball-Casters, of which the following is a specification:

Ball-casters have been made with a principal ball rolling against smaller balls contained in a socket, and the large ball has also been made to rest against a polished metal surface.

My improvement consists in a hardened steel bearing-plate, having projections on its upper surface, fixed in the bottom of the ball-socket, with an intermediate perforated disk receiving balls that are between the main ball and the bearing-plate, so that these balls are kept in position, but allowed to roll as the main ball turns in its socket. I steady this perforated disk by a flange or lip extending inwardly from the inside of the socket; but it is free to turn with the balls, so that the bearing-surfaces of said balls are constantly changed, so as to prevent the balls wearing flat, or the bearing-plate becoming recessed.

Figure 2:
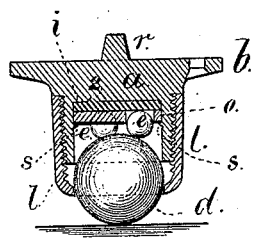
Figure 1:
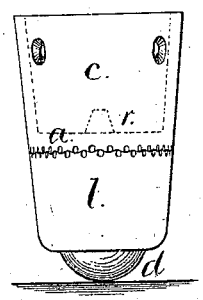
Figure 3:
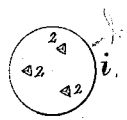
Figure 4:
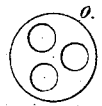

In the drawing, Figure 1 is an elevation, Fig. 2 is a vertical section, Fig. 3 is a plan of the bearing-disk, and Fig. 4 is a plan of the intermediate plate for the smaller balls.

The socket $a$ is made with either the flange $b$, Fig. 2, or the socket $c$, Fig. 1, by which the caster is attached to the leg of the chair, table, or other article, as usual. The socket $a$ is of the proper depth for receiving the caster-ball $d$, the anti-friction balls $e\ e\ e$, and the bearing-disk $i$, and the ball $d$ is retained in place by the screw-sleeve $t$ that screws upon the outside of the socket $a$. The bearing-disk $i$ is made with projections 2 2 upon its upper surface, and these pass into depressions in the socket.

It is preferable to employ a disk, $i$, of hardened steel, and these projections 2 embed themselves into the metal of the caster-socket when the disk is pressed firmly to its place in the socket.

The balls $e\ e\ e$ are in an opening or openings through the disk $o$, so that this disk $o$ keeps the balls in their proper relative positions, and this disk $o$ is sufficiently loose to turn freely in the socket $a$, but it is kept from tipping or becoming displaced by a small flange, $s$, made within the socket by a feather of metal cut or pressed up so as to project from the interior surface of the socket over the outer edge of the disk $o$.

Figure 6:
Figure 5:
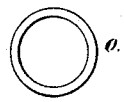

The disk $o$ may have separate holes, as shown in Figs. 2 and 4; but the central opening and ball recesses (shown in Figs. 5 and 6) are generally preferable as most easily cut out by dies.

The sleeve $l$ is retained by indentations made around the joint or line of division where the sleeve and socket join together, as seen in Fig. 1. These indentations spread the metal in opposite directions, so as to corrugate and interlock the metal at the joint after the sleeve has been screwed up tightly, thereby preventing the sleeve unscrewing.

I claim as my invention—

1. The ball-caster made with the bearing-disk $i$ of hardened steel, secured within the socket $a$ by the pins 2, in combination with the intermediate perforated disks $o$, balls $e$, caster-ball $d$, and sleeve $l$, substantially as set forth.

2. The ball-caster made with the sleeve $l$ screwed upon the socket $a$, and retained from unscrewing by indentations made at alternate opposite sides of the joint, as set forth.

Signed by me this 10th day of February, A. D. 1874.

JOB JOHNSON.

Witnesses:
GEO. T. PINCKNEY,
CHAS. H. SMITH.